United States Patent [19]
Lyman, Jr.

[11] 3,757,147
[45] Sept. 4, 1973

[54] STEPPING MOTOR
[75] Inventor: Frank Lyman, Jr., Cambridge, Mass.
[73] Assignee: Cambridge Thermionic Corporation, Cambridge, Mass.
[22] Filed: May 18, 1971
[21] Appl. No.: 144,494

[52] U.S. Cl. .................. 310/49, 310/90, 310/112
[51] Int. Cl. .......................................... H02k 37/00
[58] Field of Search ................... 310/49, 90, 268, 310/112, 114, 124, 162, 163; 308/178, 189

[56] References Cited
UNITED STATES PATENTS

| | | | |
|---|---|---|---|
| 3,469,123 | 9/1969 | Inaba | 310/49 |
| 3,429,224 | 2/1969 | Osburn | 308/178 |
| 3,456,138 | 7/1969 | Huber | 310/49 |
| 2,982,872 | 5/1961 | Fredrickson | 310/163 |
| 2,206,323 | 7/1940 | Hughes | 308/178 |
| 2,446,290 | 8/1948 | Lovegrove | 310/49 |

FOREIGN PATENTS OR APPLICATIONS
1,032,040  6/1958  Germany ................ 308/178

Primary Examiner—R. Skudy
Attorney—Sewall P. Bronstein, Robert F. O'Connell et al.

[57] ABSTRACT

A multiphase rotary stepping motor of the type having a shaft with the rotors distributed axially thereon, and a housing carrying the axially distributed stators, the rotors and stators having their respective pole-forming elements separated by axial air gaps. The shaft is mounted for rotation in the housing by a bearing arrangement which includes an axially fixed bearing, such as a duplex bearing, located at one end of the motor to restrict axial motion of the shaft, and an axially floating bearing located at the other end of the motor and freely allowing the shaft to move axially as a result of thermal expansion and contraction. Mounted on the free end of the shaft are inertial damping means in the form of an annular mass concentric with the shaft, with a spring and disks of low friction material, such as Teflon, linking the shaft and annular mass in a predetermined pressure and friction relationship.

5 Claims, 9 Drawing Figures

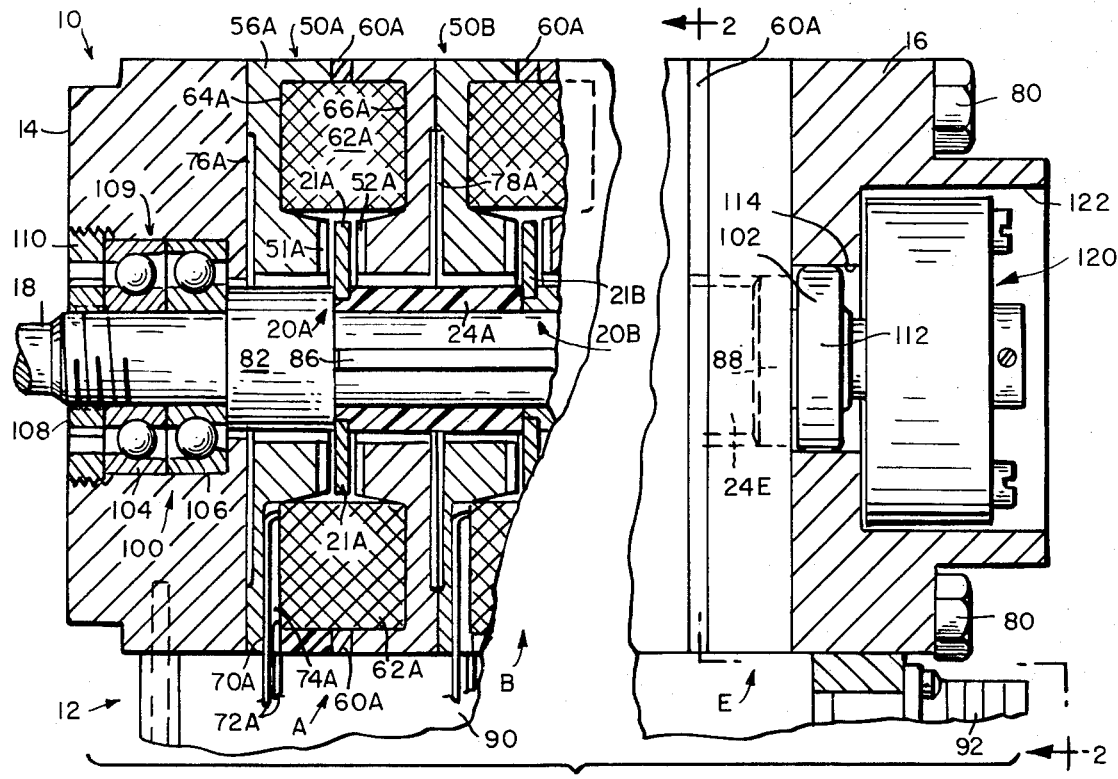
FIG. I
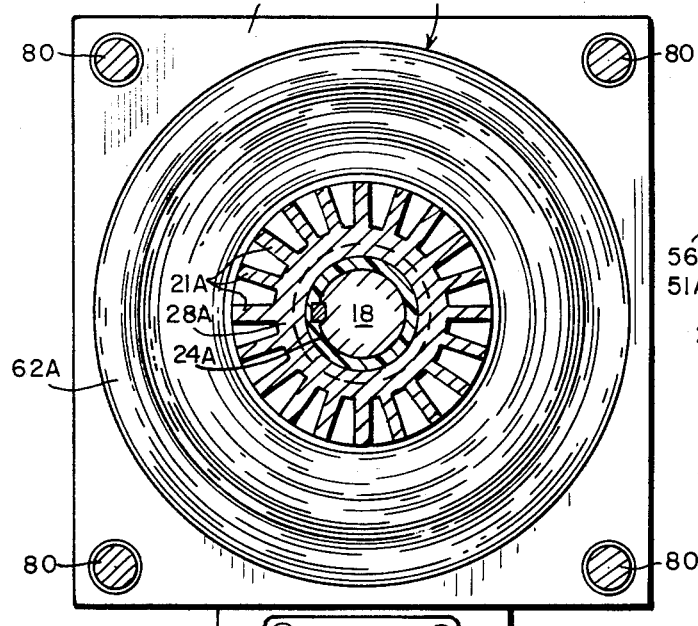
FIG. 2
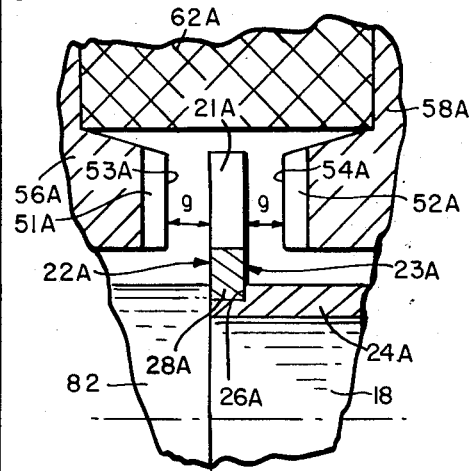
FIG. IA

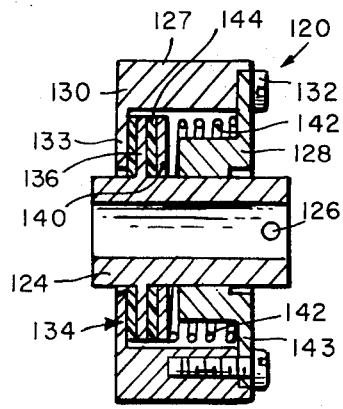
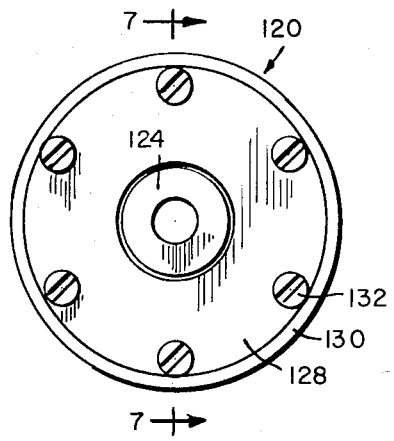
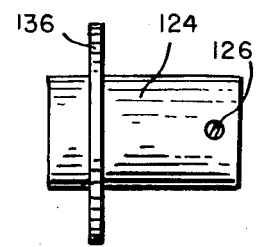
FIG.7　FIG.6　FIG.8
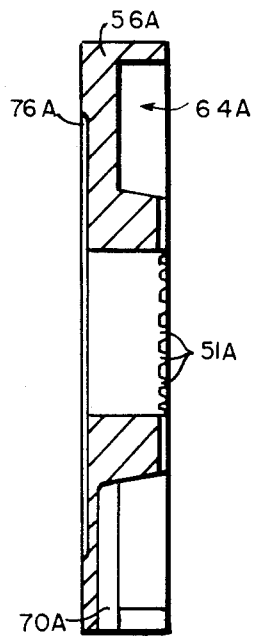
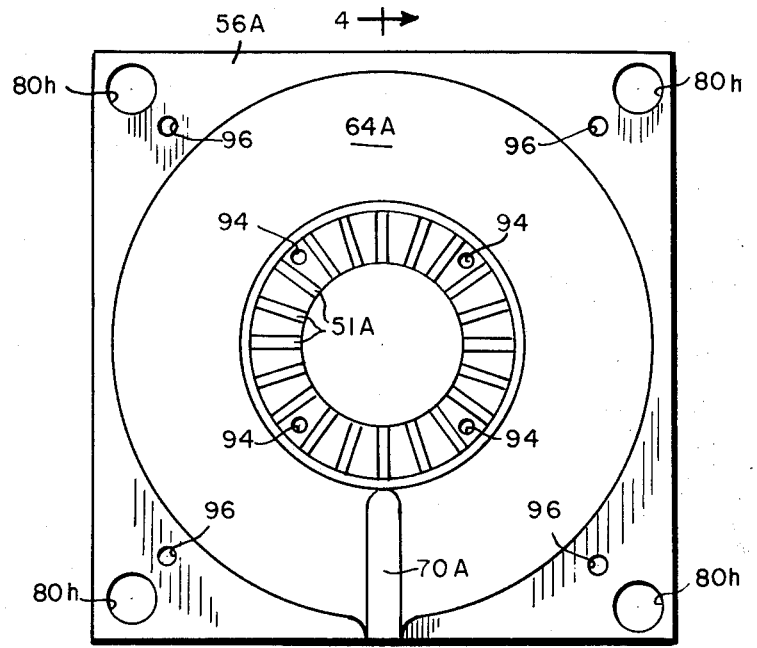
FIG.4　FIG.3
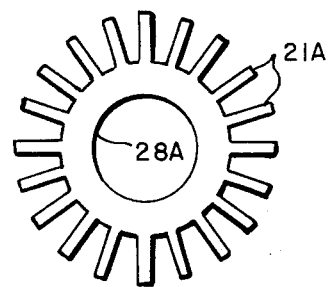
FIG.5

STEPPING MOTOR

BACKGROUND OF THE INVENTION

The present invention relates generally to rotary stepping motors, and more particularly to mounting and inertial problems associated with the rotating portions thereof.

Stepping motors or impulse motors, which rotate through a predetermined angle upon application of a pulse of current, have been useful in fields where positive, accurate, discrete movements reliably responsive to relatively high frequency pulses are desired. Applications involving the frequent repositioning of a mechanical member to successively different positions are ideally adapted for the use of a stepping motor. An example that is of increasing importance is the numerical or pulse programmed automated control of machinery. The pulse instructions are converted directly to accurate mechanical motions by the stepping motor.

Typical stepping motor construction provides, for each phase, a set of rotor poles, a set of stator poles alignable with the rotor poles and a coil for generating a magnetic field. The magnetic field produces forces which bring the rotor poles into alignment with the stator poles, which is the lowest reluctance configuration. Stepping motors are normally of multiphase construction, which means they employ a plurality of alignable sets of rotor and stator poles, the rotor or stator poles of successive phases being offset by an angle that is generally a predetermined fraction of the angle between adjacent poles in a single combination. As an example, a five phase motor with twenty rotor and stator poles in each phase spaced 18° apart would have its five phases offset successively by one fifth of 18° or 3.6°. The phases are pulsed sequentially to bring each rotor-stator combination from non-alignment into an aligned configuration, thereby to rotate the shaft to which to rotors are commonly joined. Each pulse in the example corresponds to 3.6° rotation, which is the precision of control available.

The rotating parts of a stepping motor, i.e., the shaft and rotors, are subject to mounting and dynamic problems not encountered in other motors. The mounting problem arises because, in common stepping motor construction, the rotor pole pieces extend radially from a shaft and into an axial space between opposed pole faces on the stator pole pieces. An axial air gap, through which magnetic flux passes, exists between the adjacent rotor and stator pole faces. Reduction of the width of these air gaps increases the aligning forces of the magnetic field and thus increases the motor's torque and power. Reduction in width of the axial air gap, however, necessarily restricts the axial freedom of the motor shaft if collisions between rotor and stator are to be avoided. Various proposals have dealt with the problem of reduced axial shaft mounting tolerance brought about by reduced axial air gaps. One proposal, disclosed in Inaba U.S. Pat. No. 3,469,123, isolates the axial motion of the rotors with thrust bearings, while permitting the shaft on which the rotors ride to move axially. This proposal, however, results in a fairly complicated bearing arrangement which still must allow for the effects of thermal expansion and contraction of the rotors so constrained. When enough axial play is retained to allow for these effects, new mounting problems arise if gap widths are not to be adversely affected.

The dynamic problem of stepping motors results from their angular control requirements, and from the fact that they are advanced by the application of a pulse of current. Higher speeds and larger torques call for very fast pulse rise times, but with limitation of peak current, as exemplified by the copending application of William McDonald, Ser. No. 139,721, filed May 3, 1971. The application of discrete pulses of current to the stepping motor results in uneven forces applied to the rotors, and a certain loss of smoothness of operation. The conventional manner of dealing with this problem is to increase rotational inertia to benefit from the flywheel effect. In stepping motors, however, this approach cannot be used with much success since one major advantage of a stepping motor is the precise rotational control that can be obtained, allowing the shaft to be stopped with a positional accuracy of the offset between successive phases, e.g., 3.6° for the five phase, twenty pole motor previously given as an example. Moreover, low rotational inertia is desirable in a stepping motor to enable it to be started quickly, at a high pulse rate.

SUMMARY OF THE INVENTION

Objects of the present invention are to provide a stepping motor which eliminates the mounting and inertial problems of the prior art, and which is simply, easily and inexpensively constructed.

The stepping motor according to the invention is of the multiphase type having a plurality of phases distributed axially along a shaft. In conventional fashion, each phase comprises a rotor rotationally secured to the shaft and having radially extending pole pieces presenting axial pole faces, and a stator around the rotor and having radially extending pole pieces presenting axial pole faces confronting the rotor pole faces and a coil to develop a flux path through rotor and stator upon passage of current in the coil. Housing means support the stators, and according to the invention, bearing means mount the shaft within the housing means, the bearing means comprising an axially fixed bearing, such as a duplex bearing, located at one end of the motor and restraining axial motion of the shaft. At the other end of the motor, the bearing means comprises an axially floating bearing allowing the shaft to move axially. Without axial play in the shaft, its accurate positioning during mounting is simplified, and tolerances between rotor and stator pole pieces are maintained more accurately.

Mounted on the floating end of the shaft are damper means frictionally connecting an annular mass to the shaft for inertial control and energy absorption. In one practical version of the invention, the damping means comprises a flange extending radially from the shaft, disks of friction material such as Teflon positioned on each side of said radial flange, the annular mass having a pair of faces for engagement with said friction disks and spring means urging said faces together.

These and other objects and novel aspects of the invention will be apparent from the following description of a preferred embodiment.

DESCRIPTION OF THE DRAWING

FIG. 1 is an axial section of a stepping motor according to the invention;

FIG. 1A is a portion of FIG. 1 to greater scale;

FIG. 2 is a section on line 2—2 of FIG. 1 showing details of rotor construction;

FIG. 3 is an end view of a stator member;

FIG. 4 is a section on line 4—4 of FIG. 3;

FIG. 5 is an end view of a rotor member;

FIG. 6 is an end view, as from the righthand end of FIG. 1, of damping means according to the invention;

FIG. 7 is a section on line 7—7 of FIG. 6; and

FIG. 8 is a side view of a portion of the damping means of FIGS. 6 and 7.

DESCRIPTION OF THE PREFERRED EMBODIMENT

The illustrated stepping motor 10 is of multiphase construction with five separate phases each having twenty sets of alignable rotor and stator poles and therefore providing angular control to one-hundredth of a revolution, or 3.6°. The stepping motor 10 comprises a housing assembly 12 with end blocks 14 and 16 serving to rotatably mount a shaft 18 in a manner to be described below. Between end blocks 14 and 16, and distributed axially along shaft 18, are the five phases A through E (only phases A, B, and E being shown in FIG. 1). The phases A through E comprise rotors 20A through 20E carried by shaft 18 and stators 50A through 50E secured to end blocks 14 and 16 by means of four bolts 80. The stator poles of successive phases are offset by an angle of 3.6°. With the exception of this angular offset, the phases A through E are similarly constructed and the following description of phase A serves to describe the other phases as well.

Each rotor, such as 20A, has its individual poles formed by rotor pole pieces 21A which extend radially and present axially looking pole faces 22A and 23A (FIG. 1A). The individual stator poles are formed by opposed stator pole pieces 51A and 52A presenting pole faces 53A and 54A adjacent to the rotor pole faces 22A and 23A with axial gaps $g$ therebetween. Stepping motor rotation takes place when current through stator coil 62A creates a magnetic potential between stator pole pieces 51A and 52A, attracting rotor pole piece 21A into alignment therewith.

Rotor 20A of phase A comprises a non-magnetic cylindrical spacer sleeve 24A mounted by key 86 on shaft 18 in abutment with an enlarged hub 82 formed thereon. Sleeve 24A is provided with a shoulder 26A which mounts a rotor disk 28A (FIG. 5) having the rotor pole pieces 21A formed thereon. Rotor disk 28A, which is made of a magnetic material such as silicon iron, is secured, for example with silver solder, to spacer sleeve 24A with rotor pole pieces 21A in correct angular orientation with respect to key 86. The rotors of phases B through D are identically constructed, but the rotor of phase E has a spacer sleeve 24E which is shorter than spacer sleeves 24A through 24D to make room for a retainer nut 88 which is threaded on shaft 18 and which secures all the spacer sleeves against axial movement on shaft 18.

Stator portion 50A of phase A comprises two opposed stator disks 56A and 58A of magnetic material such as silicon iron and having stator pole pieces 51A and 52A, respectively, formed thereon like teeth on a face gear (FIGS. 3 and 4).

Stator disks 56A and 58A are provided with facing annular cavities 64A and 66A and are separated by a spacer plate 60A of magnetic material such as silicon iron and which has a central aperture 68A coinciding with the outside edge of cavities 64A and 66A. Coil 62A is secured within the annular space so provided. One of the stator disks, such as 56A (FIGS. 1, 3 and 4) is provided with a slot 70A to enable leads 72A of coil 62A to pass into a wiring conduit 90 secured to end blocks 14 and 16 and provided at one end with a connector socket 92 for connection to the circuits which drive stepping motor 10. A silicon rubber plug 74A (FIG. 1) closes slot 70A. As shown in FIGS. 2 and 3, the stator disks 56A and 58A and the spacer 60A are substantially square, being provided with corner holes 80$h$ to receive the bolts 80 securing them to the housing end blocks 14 and 16. In addition, as shown in FIG. 3, stator disks 56A and 58A are provided with four diagonally located observation holes 94 situated between stator holes 51A or 52A for the purpose of measuring the portion of the rotor and its squareness, and four diagonally located observation holes 96 situated outside coil cavity 64A or 66A for the purpose of measuring the portions of the stator plates' mating surfaces at the corners thereof. The observation holes 94 and 96 are plugged, after measurement, with flat head set screws (not shown).

The stator disks 56A, 58A of phase A abut end block 14 on one side and the stator disks 56B, 58B of phase B on the other side, and the stator disks of the remaining phases are similarly in abutment. To avoid magnetic interaction of adjacent phases as a result of this abutting relationship, the stator disks 56A, 58A are provided on their abutting surfaces with shallow outer recesses 76A, 78A which form air gaps between adjacent phases with sufficient reluctance to prevent the flux of one phase from linking the other phases to any substantial extent.

As can be seen from the foregoing description, the phases A through E are constructed in layers. Accordingly, assembly of phases A through E takes place by assembling end block 14 and shaft 18 as described below and then by stacking successive layers for rotor and stator of the five phases and then by securing the stacked layers together.

As indicated in FIG. 1 and as described above, axial air gaps $g$ are formed between the rotor pole faces 22A and 23A and the stator pole faces 53A and 54A of phase A, and of the other phases as well. It is desirable to make gaps $g$ as narrow as possible to increase the attracting forces on rotor pole pieces 21A for a given passage of current in the coil 62A. As the gaps $g$ are made narrower, the axial positioning of rotor pole pieces 21A becomes more critical. End thrust on shaft 18, wear in the mount of shaft 18, and thermal expansion of shaft 18 all contribute to axial movement of rotor pole pieces 21A and prevent usage of narrow gaps $g$.

To solve these problems of axial positioning of the rotor pole pieces, the present invention mounts shaft 18 with an axially fixed bearing 100 located at one end of the five phases A through E, and an axially floating bearing 102 located at the other end of the phases A through E. The axially fixed bearing 100 prevents axial displacement due to end thrust on shaft 18; the axially floating bearing 102 permits the free end of the shaft to move axially to allow for thermal expansion and contraction, thus eliminating any need for providing axial play in the support of shaft 18.

As illustrated in FIG. 1, the axially fixed bearing 100 is a duplex bearing comprising a pair of single row bearings 104 and 106 mounted face to face under preload conditions with inner races secured against hub 82 and around shaft 18 by retainer nut 108 threaded thereon and with outer preloading races secured in a cylindrical recess 109 in end block 14 by retainer nut 110 threaded therein. A suitable practical version of bearing 100 is provided by the duplex bearing manufactured by Fafnir as Model 7203-DU.

The axially floating bearing 102 is a ball bearing, such as Fafnir Model 201KDD, whose inner race is secured to shaft 18 and whose outer race 112 slides within a cylindrical hole 114 provided in end block 16. Whatever thermal expansion and contraction may develop is accommodated by axial motion of bearing 102. This arrangement not only eliminates frequent sources of axial displacement of shaft 18, but also enables shaft 18 to be very accurately placed during assembly since there is no need to provide axial play.

As shown in FIG. 1, stepping motor 10 further comprises a damping means 120 mounted on shaft 18 within a cylindrical recess 122 provided in end block 16. Referring to FIGS. 6, 7 and 8, damping means 120 comprises an inner sleeve 124 having set screws 126 to secure it to shaft 18. Rotatable about sleeve 124 is an annular mass member 127 concentric with shaft 18 and comprising members 128 and 130 secured together by bolts 132. A frictional linkage is provided between sleeve 124 on the one hand and annular mass member 127 on the other hand by means of the frictional linkage 134 shown in FIG. 7. As illustrated, sleeve 124 has an integral, radially extending flange 136 which is disposed between an inwardly extending radial flange 138 provided on annular member 130, and a washer 140 resiliently urged towards flange 138 by a compression spring 142 pushing against a flange 143 on member 128. Separating sleeve flange 136 from flange 138 and washer 140 are two disks 144 of friction reducing material, such as Teflon.

The inertial mass of annular members 128 and 130, washer 140 and spring 142, is thus frictionally connected to shaft 18. When shaft 18 is rotated with sufficient acceleration to cause slippage at the frictional interfaces, then frictional energy will be absorbed and the inertial forces on shaft 18 will be reduced, the energy of the rotating mass being transferred to heat by friction. When acceleration of shaft 18 is too low to cause slippage, damper 120 behaves like a simple rotating inertial mass in the manner of a flywheel.

From the foregoing description, it can be appreciated that damper 120 permits stepping motor 10 to be accelerated very quickly, both on starting and stopping, since frictional slippage lowers the effective moment of inertia of the rotating parts. When the motor 10 is running at a fairly uniform speed, however, damper 120 increases the moment of inertia of the rotating parts and, acting like a flywheel, smooths out the impulses of power applied to the shaft 18 for steadier operation. Any energy impulses causing the speed of shaft 18 to deviate markedly from its average speed will result in frictional slippage and will cause a portion of such energy to be absorbed by damper 120 rather than to be transmitted through shaft 18. The precise relationship of mass, coefficient of friction, and spring force which works best in any particular environment and speed range can be determined experimentally.

It should be understood that the foregoing description is for the purpose of illustration and that the invention includes all modifications within the scope of the appended claims.

I claim:
1. A multiphase rotary stepping motor comprising
    a shaft;
    a plurality of motor phases distributed axially along said shaft, each of said phases comprising a rotor portion rotationally and axially secured to said shaft and having radially extending pole pieces, and a stator portion around said rotor portion and having a coil and pole pieces, said stator pole pieces being alignable with and separated by gaps from their associated rotor pole pieces for developing a flux path therethrough upon passage of current in said coil;
    housing means secured to said stator portions; and
    bearing means associated with said housing means for mounting said shaft, said bearing means comprising
    an axially fixed bearing located at one end of said motor phases for axially positioning said stator and rotor pole pieces with respect to each other and for restricting axial motion of said shaft at said one end, said axially fixed bearing being a duplex bearing having separate single bearings in face to face relationship;
    an axially floating bearing located at the other end of said motor phases and permitting axial motion of said shaft and said rotor pole pieces over a preselected distance, said gaps accommodating the axial motion of said rotor pole pieces over said preselected distance.

2. A multiphase rotary stepping motor comprising
    a shaft;
    a plurality of phases each comprising a rotor portion secured to said shaft and having rotor pole pieces, and a stator portion around said rotor portion and having stator pole pieces alignable with said rotor pole pieces; and
    damping means mounted on said shaft for absorbing energy imparted to said shaft and causing substantial acceleration thereof, said damping means including
    a flange rotating said shaft;
    a floating annular mass rotatable around said shaft; and
    means frictionally interengaging said flange and mass and permitting slippage therebetween upon acceleration of said shaft.

3. A multiphase rotary stepping motor according to claim 2 wherein said damping means comprises a sleeve carrying said flange and mounted on said shaft, said annular mass comprising a pair of members on opposite sides of said sleeve flange and being resiliently urged together, said frictionally interengaging means comprising a pair of friction reducing disks disposed in contact with the sides of said sleeve flange.

4. A multiphase rotary stepping motor according to claim 3 wherein the annular mass members resiliently urged against said sleeve flange comprise a flange on said annular mass, and a washer disposed within said annular mass and being resiliently urged toward said flanges by a spring.

5. A multiphase rotary stepping motor comprising
    a shaft;
    a plurality of phases each comprising a rotor portion secured to said shaft and having rotor pole pieces, and a stator portion around said rotor portion and having stator pole pieces alignable with said rotor pole pieces; and damping means mounted on said shaft for absorbing energy imparted to said shaft and causing substantial acceleration thereof, said damping means comprising a sleeve secured to said shaft;

a radially extending flange integral with said sleeve;

an annular mass having a first portion with a flange extending radially inward and adjacent to said sleeve flange, and a second portion secured to said first portion, an axial compression spring disposed between said first and second portions, and a washer between said sleeve flange and said spring; and disks of friction reducing material between said sleeve flange and said mass flange and between said sleeve flange and said washer.

* * * * *